US010504635B2

(12) United States Patent
Imaji et al.

(10) Patent No.: US 10,504,635 B2
(45) Date of Patent: Dec. 10, 2019

(54) CARBONACEOUS MATERIAL FOR NONAQUEOUS ELECTROLYTE SECONDARY BATTERY NEGATIVE ELECTRODE (71) Applicant: KURARAY CO., LTD., Kurashiki-Shi, Okayama (JP)

(72) Inventors: Makoto Imaji, Tokyo (JP); Yasuhiro Tada, Tokyo (JP); Naohiro Sonobe, Tokyo (JP)

(73) Assignee: KURARAY CO., LTD., Kurashiki-Shi (JP)

( * ) Notice: Subject to any disclaimer, the term of this patent is extended or adjusted under 35 U.S.C. 154(b) by 0 days.

(21) Appl. No.: 14/654,619

(22) PCT Filed: Feb. 19, 2014

(86) PCT No.: PCT/JP2014/053862
§ 371 (c)(1),
(2) Date: Jun. 22, 2015

(87) PCT Pub. No.: WO2014/129487
PCT Pub. Date: Aug. 28, 2014

(65) Prior Publication Data
US 2015/0340693 A1 Nov. 26, 2015

(30) Foreign Application Priority Data
Feb. 19, 2013 (JP) ................... 2013-029928

(51) Int. Cl.
*H01B 1/04* (2006.01)
*H01M 4/133* (2010.01)
*H01M 4/1393* (2010.01)
*H01M 4/587* (2010.01)
*H01M 10/0525* (2010.01)
*C01B 32/05* (2017.01)

(52) U.S. Cl.
CPC ............... *H01B 1/04* (2013.01); *C01B 32/05* (2017.08); *H01M 4/133* (2013.01); *H01M 4/1393* (2013.01); *H01M 4/587* (2013.01); *H01M 10/0525* (2013.01); *C01P 2004/61* (2013.01); *C01P 2006/11* (2013.01); *C01P 2006/12* (2013.01); *C01P 2006/40* (2013.01); *Y02T 10/7011* (2013.01)

(58) Field of Classification Search
CPC .. H01B 1/04; H01B 1/18; H01B 1/24; H01M 4/583; H01M 4/587; H01M 4/624; H01M 4/625; H01M 4/663; H01M 4/133; H01M 4/1393; H01M 10/0525; C01B 31/02; C01B 32/00; C01B 32/05; C01P 2004/61; C01P 2006/11; C01P 2006/12; C01P 2006/40
USPC ..... 252/502, 510, 511, 182.1; 429/212, 213, 429/217, 231.8; 432/445 R, 448, 449.1, 432/449.2, 449.6, 449.8, 460
See application file for complete search history.

(56) References Cited

U.S. PATENT DOCUMENTS

| 5,093,216 A * | 3/1992 | Azuma | C04B 35/528 |
| | | | 252/182.1 |
| 5,340,670 A * | 8/1994 | Takami | H01M 4/587 |
| | | | 423/445 R |
| 5,451,477 A * | 9/1995 | Omaru | H01M 4/583 |
| | | | 429/231.1 |
| 5,587,255 A * | 12/1996 | Sonobe | H01B 1/04 |
| | | | 423/445 R |
| 5,616,436 A | 4/1997 | Sonobe et al. | |
| 5,741,472 A * | 4/1998 | Sonobe | C01B 31/005 |
| | | | 423/445 R |
| 5,772,974 A * | 6/1998 | Ohashi | C01B 31/02 |
| | | | 252/502 |
| 5,985,489 A | 11/1999 | Ohsaki et al. | |
| 6,245,461 B1 | 6/2001 | Smith et al. | |

(Continued)

FOREIGN PATENT DOCUMENTS

CA 2197858 A1 1/1997
CA 2250719 A1 4/1999
(Continued)

OTHER PUBLICATIONS

First Office Action dated Aug. 31, 2016, English translation in Chinese Patent Application No. 201480006853.4, with English translation.

(Continued)

*Primary Examiner* — Harold Y Pyon
*Assistant Examiner* — Matthew R Diaz
(74) *Attorney, Agent, or Firm* — Birch, Stewart, Kolasch & Birch, LLP (57) ABSTRACT An object of the present invention is to provide a carbonaceous material for a negative electrode for producing a nonaqueous electrolyte secondary battery capable of rapid charge and discharge and having excellent rate characteristics (output characteristics) while maintaining a large discharge capacity.

The problem described above can be solved by a carbonaceous material for a nonaqueous electrolyte secondary battery negative electrode of the present invention obtained by heat-treating a non-graphitizable carbon precursor which is pulverized and contains from 13 to 80 wt. % of a volatile component. With the present invention, it is possible to provide a carbonaceous material for a nonaqueous electrolyte secondary battery negative electrode, whereby a nonaqueous electrolyte secondary battery having a large charge-discharge capacity and having excellent rate characteristics can be produced.

6 Claims, 1 Drawing Sheet

(56) References Cited

U.S. PATENT DOCUMENTS

| | | | |
|---|---|---|---|
| 6,303,249 B1 | 10/2001 | Sonobe et al. | |
| 6,335,122 B1 | 1/2002 | Yamada et al. | |
| 6,475,461 B1 | 11/2002 | Ohsaki et al. | |
| 7,718,307 B2 * | 5/2010 | Shimizu | C01B 31/02 423/445 R |
| 7,858,239 B2 * | 12/2010 | Shimizu | H01M 4/587 423/445 R |
| 9,327,978 B2 * | 5/2016 | Haga | C01B 31/02 |
| 2003/0068552 A1 | 4/2003 | Anglin et al. | |
| 2007/0009418 A1 | 1/2007 | Kobayashi et al. | |
| 2007/0287068 A1 | 12/2007 | Shimizu et al. | |
| 2009/0126172 A1 | 5/2009 | Kobayashi et al. | |

FOREIGN PATENT DOCUMENTS

| | | | |
|---|---|---|---|
| CN | 1255244 A | 5/2000 | |
| CN | 1846322 A | 10/2006 | |
| CN | 1947286 A | 4/2007 | |
| EP | 0 573 266 A1 | 12/1993 | |
| EP | 0646978 A1 | 4/1995 | |
| EP | 0 767 505 A1 | 4/1997 | |
| EP | 0 767 505 B1 | 5/1999 | |
| EP | 1 288 160 A1 | 3/2003 | |
| EP | 1739771 A1 | 1/2007 | |
| EP | 2 624 345 A1 | 8/2013 | |
| JP | 4-338106 A | 11/1992 | |
| JP | 7-230803 A | 8/1995 | |
| JP | H0864207 A | 3/1996 | |
| JP | 8-112539 A | 5/1996 | |
| JP | 9-161801 A | 6/1997 | |
| JP | 9-293507 A | 11/1997 | |
| JP | 10-21919 A | 1/1998 | |
| JP | 2828509 B2 | 11/1998 | |
| JP | 11-135108 A | 5/1999 | |
| JP | 3719790 B2 | 11/2005 | |
| JP | 2006086011 A | 3/2006 | |
| JP | 2006-188366 A | 7/2006 | |
| JP | 2008282547 A | 11/2008 | |
| KR | 10-2007-0001212 A | 1/2007 | |
| WO | WO 96/30318 A1 | 10/1996 | |
| WO | WO 97/01192 A1 | 1/1997 | |
| WO | WO2005027242 A1 | 3/2005 | |
| WO | WO2005098999 A1 | 10/2005 | |
| WO | WO 2011/157013 A1 | 12/2011 | |
| WO | WO 2012/043666 A1 | 4/2012 | |
| WO | WO-2013111595 A1 * | 8/2013 | H01M 4/587 |

OTHER PUBLICATIONS

Notification of Reason for Refusal dated Oct. 12, 2016, in Korean Patent Application No. 10-2015-7023925, with English translation.
International Search Report of PCT/JP2014/053862 dated Jun. 3, 2014.
Extended European Search Report dated Aug. 8, 2016, for European Application No. 14754252.6.
Second Office Action dated May 15, 2017, in Chinese Patent Application No. 201480006853.4, with English translation.
Office Action dated Jul. 3, 2017, in Chinese Patent Application No. 201380044836.5, with English translation.
Chinese Office Action and Search Report, dated Dec. 3, 2015, for Chinese Application No. 201380044836.5, with English translations.
Chinese Office Action, dated Feb. 4, 2017, for Chinese Application No. 201380044836.5, with an English translation.
Chinese Office Action, dated Sep. 5, 2016, for Chinese Application No. 201380044836.5, with an English translation.
English translation of the Written Opinion of the International Searching Authority and International Search Report (forms PCT/ISA/237 and PCT/ISA/210), dated Oct. 8, 2013, for International Application No. PCT/JP2013/073348, with an English translation of the International Search Report.
European Office Action, dated Feb. 9, 2017, for European Application No. 13833845.4.
Extended European Search Report, dated Mar. 15, 2016, for European Application No. 13833845.4.
U.S. Office Action, dated Oct. 9, 2015, for U.S. Appl. No. 14/424,723.
Communication pursuant to Article 94(3) EPC dated Oct. 27, 2017, in European Patent Application No. 13 833 845.4.
Office Action dated Dec. 4, 2017, in Chinese Patent Application No. 201380044836.5, with English translation.

* cited by examiner

CARBONACEOUS MATERIAL FOR NONAQUEOUS ELECTROLYTE SECONDARY BATTERY NEGATIVE ELECTRODE

TECHNICAL FIELD

The present invention relates to a carbonaceous material for a negative electrode of a nonaqueous electrolyte secondary battery and a production method thereof. With the present invention, it is possible to provide a carbonaceous material for a nonaqueous electrolyte secondary battery negative electrode, whereby a nonaqueous electrolyte secondary battery having a large charge-discharge capacity and having excellent rate characteristics can be produced.

BACKGROUND ART

Lithium ion secondary batteries are widely used in small portable device applications such as mobile telephones or notebook personal computers. Non-graphitizable carbon can be doped and de-doped with lithium in an amount exceeding the theoretical capacity of 372 mAh/g of graphite and also has excellent input/output characteristics, cycle durability, and low-temperature characteristics, so it has been developed (Patent Document 1) and used as a negative electrode material for lithium ion secondary batteries.

In recent years, lithium ion secondary batteries have been increasingly developed and put into practical use for automobile applications due to increasing concern for environmental issues. In automobile applications, there is a particular demand for input/output characteristics, cycle durability, and low-temperature characteristics in addition to a large doping capacity and de-doping capacity (that is, charge-discharge capacity), and non-graphitizable carbon is preferable in that it is excellent with regard to these points.

Among automobile applications, in the case of a hybrid electric vehicle (HEV), there is a demand for high input/output characteristics for repeating the supply and receipt of a large current in a short amount of time at the time of a decelerating or light-load running mode or at the time of regeneration by braking. In order to obtain such a nonaqueous electrolyte secondary battery, a non-graphitizable carbonaceous material with a further reduced resistance has been proposed as a material for a negative electrode (Patent Document 2).

However, although the nonaqueous electrolyte secondary battery using a carbonaceous material described in Patent Document 2 has improved input/output characteristics, the charge-discharge capacity is reduced. For example, a nonaqueous electrolyte secondary battery used in an electric vehicle (EV) driven by a motor alone must have not only a long life and excellent input/output characteristics, but also a high energy density. Therefore, there is a demand to improve rate characteristics (output characteristics) while maintaining a discharge capacity greater than the theoretical capacity of graphite (372 mAh/g).

CITATION LIST

Patent Literature

Patent Document 1: Japanese Unexamined Patent Application Publication No. H08-064207A
Patent Document 2: WIPO2005/098999

SUMMARY OF INVENTION

Technical Problem

Accordingly, an object of the present invention is to provide a carbonaceous material for a negative electrode for producing a nonaqueous electrolyte secondary battery capable of rapid charge and discharge and having excellent rate characteristics (output characteristics) while maintaining a large discharge capacity.

Solution to Problem

Conventional non-graphitizable carbonaceous materials for secondary battery negative electrodes were produced by performing preliminary calcination (pre-calcination), pulverization, and then main calcination on a petroleum pitch that has been infusibilized by oxidation (Patent Documents 1 and 2). For example, the non-graphitizable carbonaceous material described in Patent Document 2 is produced by performing preliminary calcination by holding an oxidized pitch for one hour at 600° C., pulverizing the carbon precursor obtained by preliminary calcination, and then calcining the product at 1,200° C.

As a result of conducting dedicated research in order to obtain a nonaqueous electrolyte secondary battery which maintains its discharge capacity and has excellent rate characteristics (output characteristics), the present inventors discovered that a carbonaceous material with which a nonaqueous electrolyte secondary battery having a large charge-discharge capacity and having excellent rate characteristics can be produced is obtained by pulverizing a carbon precursor containing from 13 to 80 wt. % of a volatile component prior to preliminary calcination at 350° C. to 800° C. or main calcination at 800° C. to 1,600° C. and performing heat treatment including holding the product for at least ten minutes at a temperature of from 250 to 600° C. That is, by performing heat treatment after pulverizing a carbon precursor containing from 13 to 80 wt. % of a volatile component, the volatile component attaches to the pulverized carbon precursor, which smoothens the surface of the resulting carbonaceous material. The present inventors discovered that as a result, it is possible to obtain a carbonaceous material for a negative electrode having a large charge-discharge capacity and having excellent rate characteristics.

The present invention is based on such knowledge.

Therefore, the present invention relates to the following.

[1] A carbonaceous material for a nonaqueous electrolyte secondary battery negative electrode obtained by heat-treating a non-graphitizable carbon precursor which is pulverized and contains from 13 to 80 wt. % of a volatile component;

[2] the carbonaceous material for a nonaqueous electrolyte secondary battery negative electrode according to [1], wherein the heat treatment is heat treatment in which the product is held for at least one minute at a temperature of from 250 to 800° C.;

[3] the carbonaceous material for a nonaqueous electrolyte secondary battery negative electrode according to [1] or [2], wherein the heat treatment is main calcination with an attainment temperature of from 800 to 1,600° C. or preliminary calcination with an attainment temperature of at least 350° C. and less than 800° C. and main calcination with an attainment temperature of from 800 to 1,600° C.;

[4] the carbonaceous material for a nonaqueous electrolyte secondary battery negative electrode according to any one of [1] to [3], wherein an average interlayer spacing $d_{002}$ of a (002) face determined by X-ray diffraction is from 0.375 to 0.400 nm, and a true density is from 1.40 to 1.60 g/cm$^3$;

[5] the carbonaceous material for a nonaqueous electrolyte secondary battery negative electrode according to any one of [1] to [4], wherein a sulfur content is at most 4,000 ppm;

[6] a production method for a carbonaceous material for a nonaqueous electrolyte secondary battery negative electrode, the method comprising: (1) a step of pulverizing a non-graphitizable carbon precursor containing from 13 to 80 wt. % of a volatile component, (2) a heat treatment step of holding the pulverized non-graphitizable carbon precursor for at least one minute at a temperature of from 250 to 800° C., and (3) a calcination step of calcining the product at an attainment temperature of from 800 to 1,600° C.;

[7] the production method for a carbonaceous material for a nonaqueous electrolyte secondary battery negative electrode according to [6], wherein the heat treatment step (2) and the calcination step (3) are performed simultaneously, and heat treatment and calcination are performed by performing main calcination on the pulverized non-graphitizable carbon precursor at an attainment temperature of from 800 to 1,600° C. or performing preliminary calcination at an attainment temperature of at least 350° C. and less than 800° C. and then performing main calcination at an attainment temperature of from 800 to 1,600° C.;

[8] the production method for a carbonaceous material for a nonaqueous electrolyte secondary battery negative electrode according to [6] or [7], wherein a sulfur content of the non-graphitizable carbon precursor is at most 4,000 ppm;

[9] a negative electrode for a nonaqueous electrolyte secondary battery comprising the carbonaceous material for a negative electrode described in any one of [1] to [5];

[10] a nonaqueous electrolyte secondary battery comprising the negative electrode according to [9];

[11] the carbonaceous material for a nonaqueous electrolyte secondary battery negative electrode according to any one of [1] to [5], wherein a specific surface area ratio (BET/CALC) of a specific surface area (BET) determined by a BET method and a specific surface area (CALC) obtained by a formula $6/(D_{V50} \times \rho_{Bt})$ using an average particle size $D_{V50}$ and a butanol true density $\rho_{Bt}$ is at least 4.5; or

[12] the production method for a carbonaceous material for a nonaqueous electrolyte secondary battery negative electrode according to any one of [6] to [8], wherein a carbonaceous material for a nonaqueous electrolyte secondary battery negative electrode is obtained in which a specific surface area ratio (BET/CALC) of a specific surface area (BET) determined by a BET method and a specific surface area (CALC) obtained by a formula $6/(D_{V50} \times \rho_{Bt})$ using an average particle size $D_{V50}$ and a butanol true density $\rho_{Bt}$ is at least 4.5.

Advantageous Effects of Invention

With the carbonaceous material for a nonaqueous electrolyte secondary battery negative electrode of the present invention, it is possible to produce a nonaqueous electrolyte secondary battery having a large charge-discharge capacity and having excellent rate characteristics by using a negative electrode of a nonaqueous electrolyte secondary battery (for example, a lithium ion secondary battery). In addition, with the production method for a carbonaceous material for a nonaqueous electrolyte secondary battery negative electrode according to the present invention, it is possible to easily produce a carbonaceous material for a negative electrode for a nonaqueous electrolyte secondary battery having a large charge-discharge capacity and having excellent rate characteristics. Since a nonaqueous electrolyte secondary battery using the carbonaceous material for a negative electrode according to the present invention has a large charge-discharge capacity and excellent rate characteristics, the battery is useful for hybrid electric vehicles (HEV) and electric vehicles (EV), which require long life and high input/output characteristics. In particular, the battery is useful as a nonaqueous electrolyte secondary battery for an electric vehicle (EV) driven by a motor alone.

With the carbonaceous material for a nonaqueous electrolyte secondary battery negative electrode according to the present invention, it is possible to obtain a nonaqueous electrolyte secondary battery having excellent efficiency due to its low sulfur content. In addition, with the carbonaceous material for a nonaqueous electrolyte secondary battery negative electrode according to the present invention, it is possible to produce a nonaqueous electrolyte secondary battery having excellent output characteristics using a carbonaceous material exhibiting a high specific surface area ratio.

DESCRIPTION OF EMBODIMENTS

[1] Carbonaceous Material for a Negative Electrode

The carbonaceous material for a nonaqueous electrolyte secondary battery negative electrode according to the present invention can be obtained by heat-treating a non-graphitizable carbon precursor which is pulverized and contains from 13 to 80 wt. % of a volatile component.

Non-Graphitizable Carbon Precursor

The non-graphitizable carbon precursor used in the carbonaceous material for a nonaqueous electrolyte secondary battery negative electrode according to the present invention is not limited as long as it is hardly graphitizable by calcination, specifically, a carbon precursor which becomes a non-graphitizable carbonaceous material in which the average interlayer spacing $d_{002}$ of the (002) face determined by X-ray diffraction is from 0.360 to 0.400 nm and the true density is from 1.40 to 1.60 g/cm$^3$ as a result of calcination is preferable. The calcination temperature for achieving the physical characteristics described above is also not particularly limited as long as it is within the range of from 800 to 1,600° C., but "a carbon precursor in which the average interlayer spacing $d_{002}$ of the (002) face determined by X-ray diffraction is from 0.375 to 0.395 nm and the true density is from 1.40 to 1.60 g/cm$^3$ when calcined at 1,200° C.", for example, may be defined as a "non-graphitizable carbon precursor". The average interlayer spacing $d_{002}$ and the true density can be measured using the measurement methods described below.

Specific examples of non-graphitizable carbon precursors include infusibilized petroleum pitch or tar, infusibilized coal pitch or tar, infusibilized thermoplastic resins (for example, polyvinyl alcohol, polyethylene terephthalate, polyacetal, polyacrylonitrile, styrene/divinylbenzene copolymers, polyimide, polycarbonate, modified polyphenylene ether, polybutylene terephthalate, polyarylate, polysulfone, polyphenylene sulfide, polyetheretherketone, polyimide resins, fluororesins, polyamideimide, or polyetheretherketone), thermosetting resins (for example, phenol resins, furan resins, amino resins, unsaturated polyester resins, diallylphthalate resins, alkyd resins, epoxy resins, urethane resins, or silicon resins), and plant-derived organic matter (for example, coconut shells, coffee beans, tea leaves, sugar cane, fruits (tangerines or bananas), straw, broadleaf trees, coniferous trees, bamboo, and rice husks). An example of a graphitizable carbon precursor is a pitch or tar that has not been infusibilized.

In the graphitizable carbon precursor described in this specification, a "pitch or tar that has not been infusibilized" or the like refers to a substance that becomes a graphitizable carbon precursor as a result of main calcination. That is, this includes carbon precursors subjected to mild infusibilization treatment by means of oxidation.

Volatile Component

The pulverized non-graphitizable carbon precursor prior to being calcined contains from 13 to 80 wt. % of a volatile component, but the lower limit is preferably 15 wt. % and more preferably 17 wt. %. In addition, the upper limit of the volatile component is not limited as long as it is at most 80 wt. %. For example, as a product with a high volatile component content, coffee beans, which are plant-derived organic matter, may be used, but the upper limit of the volatile component is preferably 70 wt. % and more preferably 50 wt. %. It is believed that the carbonaceous material for a negative electrode according to the present invention can achieve the effect of the present invention as a result of the surface of the carbonaceous material being coated with a volatile component (for example, volatile tar) which is volatilized in the calcination process. Accordingly, when the volatile component content is less than 13 wt. %, the coating of the carbonaceous material for a negative electrode may be insufficient. In addition, when the volatile component content is greater than 80 wt. %, the yield of the carbonaceous material for a negative electrode may become low.

Examples of volatile components include $CO_2$, CO, $CH_4$, $H_2$, and tar content. The volatile component can be measured by thermogravity (TG), and in this specification, the amount of weight reduction when the temperature is increased from room temperature to 1,000° C. is defined as the volatile component. The volatile component amount can be measured by using a commercially available device capable of measuring TG and DTA at a heating rate of 10° C./min. Specifically, 20 mg of a measurement sample (for example, a pulverized carbon precursor) is precisely measured, placed in a platinum pan, and set in a device (for example, DTG-50 manufactured by the Shimadzu Corporation). Nitrogen gas is infused at 200 mL/min, and the decrease in weight is measured after heating from room temperature to 1,000° C. at a heating rate of 10° C./min. As a reference, α-alumina produced by the Shimadzu Corporation, for example, can be used.

Petroleum tar or coal tar becomes non-volatile as a result of an increase in mass (polymerization), but the volatile tar content that has not increased in mass functions as a volatile component in the present invention.

Pulverization

The non-graphitizable carbon precursor used in the present invention is pulverized prior to heat treatment. The timing of pulverization is not particularly limited as long as the non-graphitizable carbon precursor contains from 13 to 80 wt. % of a volatile component and pulverization is performed prior to heat treatment. That is, even in the case of a non-graphitizable carbon precursor in which the volatile component is gasified to a certain extent after heating for infusibilization or heating for pre-calcination is performed, a non-graphitizable carbon precursor containing from 13 to 80 wt. % of a volatile component can be pulverized.

In addition, heat treatment may be performed separately from the preliminary calcination or main calcination described below or may be performed simultaneously with preliminary calcination or main calcination. When performed simultaneously with preliminary calcination or main calcination, pulverization should be performed prior to preliminary calcination, and when preliminary calcination is not performed, pulverization should be performed prior to main calcination. In addition, when an infusibilized pitch or tar is used as a non-graphitizable carbon precursor, heat treatment may be performed simultaneously with infusibilization, and in this case, pulverization may be performed prior to infusibilization or after infusibilization.

As described below, the effect of the present invention is thought to be achieved as a result of the surface of the obtained carbonaceous material being coated with a volatile component due to heat treatment. Accordingly, it is not preferable from the perspective of the effect of the present invention to further pulverize the carbonaceous material coated with the volatile component obtained by heat treatment and main calcination. However, pulverization after main calcination is not ruled out as long as the effect of the present invention is achieved.

The pulverizer used for pulverization is not particularly limited, and a jet mill, a rod mill, a ball mill, or a hammer mill, for example, can be used.

The average particle size of the pulverized non-graphitizable carbon precursor is not particularly limited as long as the effect of the present invention is achieved, but it is close to the average particle size of the resulting carbonaceous material for a nonaqueous electrolyte secondary battery negative electrode. In actuality, the non-graphitizable carbon precursor shrinks to a particle size of approximately 97% to 85% due to calcination, so it is preferable to use an average particle size greater than the target average particle size. Specifically, the average particle size is preferably from 3 to 50 µm, more preferably from 3 to 40 µm, and even more preferably from 4 to 30 µm. When the average particle size is 50 µm or higher, the coating of the volatile component may be insufficient, and the effect of the present invention may not be achieved.

Heat Treatment

Heat treatment in the present invention is not particularly limited as long as the volatile component contained in the non-graphitizable carbon precursor is gasified and attaches to the precursor, but heat treatment preferably entails holding for at least one minute at a temperature of from 250 to 800° C.

The heating temperature is not particularly limited, but the lower limit of the heating temperature is preferably at least 250° C., more preferably at least 300° C., and even more preferably at least 350° C. The upper limit of the heating temperature is preferably at most 800° C., more preferably at most 700° C., and even more preferably at most 600° C. This is because the effect of the present invention is achieved in particular when the volatile component that is volatilized at 250° C. to 800° C. is coated (attached) onto the precursor.

In addition, the heating time is also not limited, but the lower limit is preferably at least 1 minute, more preferably at least 2 minutes, and even more preferably at least 4 minutes. Furthermore, the upper limit of the heating time is not limited. This is because the elimination or the like of the volatile component attached to the precursor does not occur as a result of a long heating time, and the effect of the present invention is maintained, but the heating time is preferably at most 48 hours and more preferably at most 24 hours from the perspective of the production process.

In this specification, "holding for at least one minute at a temperature of from 250 to 800° C." refers to being sustained for at least one minute at a given temperature from 250 to 800° C. That is, as long as the temperature is within the temperature range of from 250 to 800° C., the product may be sustained for at least one minute at a constant temperature or may be sustained for at least one minute while being heated or cooled.

In addition, heat treatment may be performed separately from the heating associated with infusibilization, pre-calcination, or main calcination, but it may also be performed simultaneously with infusibilization, pre-calcination, or main calcination as long as the effect of the present invention is achieved. That is, in treatment at 150° C. to 400° C. for infusibilization, the product may be held for at least one minute at a temperature of from 250 to 800° C. In addition, the product may be held for at least one minute at a temperature of from 250 to 800° C. until the attainment temperature of pre-calcination or main calcination is reached.

The atmosphere at the time of heat treatment is not particularly limited, but an inert gas such as nitrogen, helium, argon, krypton, or a mixed gas thereof, for example, is preferable, and nitrogen is more preferable.

Calcination

Calcination is the process of transforming a non-graphitizable carbon precursor into a carbonaceous material for a nonaqueous electrolyte secondary battery negative electrode. For example, calcination can be performed by main calcination at an attainment temperature of from 800 to 1,600° C. or can be performed by preliminary calcination at an attainment temperature of at least 350° C. and less than 800° C. and main calcination at an attainment temperature of from 800 to 1,600° C. When preliminary calcination and main calcination are performed, main calcination may be performed after first reducing the temperature after preliminary calcination, or main calcination may be performed by increasing the temperature to the temperature of main calcination directly after preliminary calcination. In addition, as described above, preliminary calcination and main calcination may be performed separately from heat treatment, or preliminary calcination and/or main calcination may be performed as heat treatment as long as the effect of the aforementioned heat treatment is achieved by preliminary calcination and main calcination.

Preliminary calcination and main calcination can be performed by a publicly known method in the field of the present invention. For example, preliminary calcination and main calcination can be performed in accordance with the main calcination procedure or the preliminary calcination and main calcination procedures described in the "production method for a carbonaceous material for a nonaqueous electrolyte secondary battery negative electrode" described below.

Infusibilization (Oxidation)

When a pitch or tar is used as a non-graphitizable carbon precursor, infusibilization treatment is performed in order to form a non-graphitizable carbon precursor. Infusibilization treatment can be performed by a publicly known method in the field of the present invention. For example, infusibilization treatment can be performed by crosslinking the carbonaceous precursor in accordance with the infusibilization (oxidation) procedure described in the "production method for a carbonaceous material for a nonaqueous electrolyte secondary battery negative electrode" described below. In addition, as described above, infusibilization may be performed separately from heat treatment, or infusibilization may be performed as heat treatment as long as the effect of the aforementioned heat treatment is achieved by infusibilization.

When a thermosetting resin and plant-derived organic matter are used as a non-graphitizable carbon precursor, it is unnecessary to perform infusibilization treatment.

Physical Characteristics

The physical characteristics of the resulting carbonaceous material for a nonaqueous electrolyte secondary battery negative electrode are not particularly limited as long as the material is a non-graphitizable carbonaceous material, but the average interlayer spacing $d_{002}$ of the (002) face determined by X-ray diffraction may be from 0.360 to 0.400 nm, and the true density may be from 1.40 to 1.60 g/cm$^3$, for example.

In the carbonaceous material of the present invention, the average interlayer spacing is preferably from 0.360 to 0.400 nm and even more preferably from 0.375 to 0.390 nm. In the case of a carbonaceous material having a small average interlayer spacing, the expansion and contraction associated with lithium doping and de-doping is large, and gaps are formed between particles, which causes the conduction network to be blocked. Therefore, the material has poor repeating characteristics, which is not preferable for automobile applications.

In the carbonaceous material of the present invention, the true density is preferably in the range of from 1.40 to 1.60 g/cm$^3$ and even more preferably within the range of from 1.45 to 1.55 g/cm$^3$.

In the crystalline structure of a carbon material, it is difficult to specify graphitizable carbon and non-graphitizable carbon with the average interlayer spacing alone, but in combination with the true density, it can be stipulated that a substance is non-graphitizable carbon.

The specific surface area of the carbonaceous material of the present invention is not particularly limited, but the BET specific surface area is preferably from 1 to 7 m$^2$/g. When the BET specific surface area exceeds 7 m$^2$/g and the material is used as a negative electrode of a nonaqueous electrolyte secondary battery, decomposition reactions with the electrolyte increase, which may lead to an increase in irreversible capacity and therefore a decrease in battery performance. On the other hand, when the BET specific surface area is less than 1 m$^2$/g and the material is used as a negative electrode of a nonaqueous electrolyte secondary battery, there is a risk that the input/output characteristics may be diminished due to a decrease in the reaction area with the electrolyte.

The sulfur content of the carbonaceous material for a nonaqueous electrolyte secondary battery negative electrode according to the present invention is not particularly limited. However, the present inventors have confirmed that, in addition to the working examples described below, the effect of the present invention can be achieved by a carbonaceous material for a nonaqueous electrolyte secondary battery negative electrode according to the present invention containing at least 700 ppm of sulfur. In addition, although there is a slight decrease in efficiency, the effect of the present invention was also achieved by a carbonaceous material for a nonaqueous electrolyte secondary battery negative electrode according to the present invention containing approximately 2,000 ppm of sulfur. Accordingly, the sulfur content is preferably at most 4,000 ppm, more preferably at most 3,000 ppm, even more preferably at most 2,000 ppm, even more preferably at most 1,000 ppm, and even more preferably at most 500 ppm. When the sulfur content is low, a nonaqueous electrolyte secondary battery produced using the carbonaceous material exhibits excellent efficiency. That is, a nonaqueous electrolyte secondary battery using a carbonaceous material with a high sulfur content may have poor initial efficiency.

The specific surface area ratio of the carbonaceous material for a nonaqueous electrolyte secondary battery negative electrode according to the present invention is not limited but is preferably at least 4.5, more preferably at least 5.0, even more preferably at least 5.5, even more preferably greater than 5.5, even more preferably at least 5.6, and most preferably at least 6.0. A nonaqueous electrolyte secondary battery produced using a carbonaceous material having a high specific surface area ratio exhibits excellent output characteristics. In addition, the upper limit of the specific surface area ratio is not limited but is preferably at most 15.0, more preferably at most 13.0, and even more preferably at most 11.0. This is because when the specific surface area ratio is too high, the output characteristics are diminished.

In this specification, the "specific surface area ratio" refers to the ratio (BET/CALC) of the specific surface area (BET) determined by a BET method and the specific surface area (CALC) obtained by the formula $6/(D_{V50} \times \rho_{Bt})$ using the average particle size $D_{V50}$ and the butanol true density $\rho_{Bt}$.

Nonaqueous Electrolyte Secondary Battery

The carbonaceous material of the present invention can be used for a negative electrode for a nonaqueous electrolyte secondary battery. In addition, a nonaqueous electrolyte secondary battery using a negative electrode for a nonaqueous electrolyte secondary battery using the carbonaceous material of the present invention has a large charge-discharge capacity and excellent rate characteristics.

The negative electrode for a nonaqueous electrolyte secondary battery according to the present invention and a nonaqueous electrolyte secondary battery using the same can be produced with a publicly known method in the field of the present invention. For example, they can be produced in accordance with the nonaqueous electrolyte secondary battery production procedure described in the "production method for a carbonaceous material for a nonaqueous electrolyte secondary battery negative electrode" described below.

Operations

As described in Patent Documents 1 and 2, conventional carbonaceous materials for nonaqueous electrolyte secondary battery negative electrodes were pulverized and subjected to main calcination after preliminary calcination (pre-calcination). Accordingly, a carbon precursor that was pulverized after preliminary calcination was not a carbon precursor containing from 13 to 80 wt. % of a volatile component since the volatile component evaporated due to preliminary calcination. In the carbonaceous material for a nonaqueous electrolyte secondary battery negative electrode according to the present invention, the pulverized carbon precursor contains from 13 to 80 wt. % of a volatile component. Therefore, it is thought that the effect of the present invention can be achieved as a result of the surface of the carbonaceous material being coated by the volatile component (for example, tar) due to heat treatment. The volatile components that can achieve the effect of the present invention are not particularly limited, but a component that volatilizes at approximately 250° C. to 800° C. is thought to fulfill an important role.

In addition, when the carbonaceous material for a nonaqueous electrolyte secondary battery negative electrode according to the present invention is observed under an electron microscope, whereas a conventional carbonaceous material for a nonaqueous electrolyte secondary battery negative electrode has a large amount of surface irregularities, the surface of the carbonaceous material of the present invention is smooth.

[2] Production Method for a Carbonaceous Material for a Negative Electrode of a Nonaqueous Electrolyte Secondary Battery The production method for the carbonaceous material for a nonaqueous electrolyte secondary battery negative electrode according to the present invention comprises (1) a step of pulverizing a non-graphitizable carbon precursor containing from 13 to 80 wt. % of a volatile component, (2) a heat treatment step of holding the pulverized non-graphitizable carbon precursor for at least one minute at a temperature of from 250 to 800° C., and (3) a calcination step of main calcining the product at an attainment temperature of from 800 to 1,600° C. The pulverization step (1) is performed prior to the heat treatment step (2).

In addition, the heat treatment step (2) and the calcination step (3) may also be performed simultaneously. When heat treatment and calcination are performed simultaneously, they can be performed by subjecting the pulverized non-graphitizable carbon precursor to main calcination at an attainment temperature of from 800 to 1,600° C. Furthermore, these steps may also be performed by performing preliminary calcination at an attainment temperature of at least 350° C. and less than 800° C. and then performing main calcination at an attainment temperature of from 800 to 1,600° C.

The production method of the present invention is a production method for obtaining a non-graphitizable carbon material, and when a petroleum pitch or coal pitch is used as a carbon source, for example, the method includes an infusibilization step of oxidizing the petroleum pitch or coal pitch at 150 to 400° C. prior to the calcination step (2). In addition, when an aldehyde resin, cellulose, coconut shell char, charcoal, coffee beans, or a thermosetting resin is used as a carbon source, the infusibilization step is not an essential step.

Furthermore, when a petroleum pitch or coal pitch is used as a carbon source, it is preferable to use a pitch having a low sulfur content. In general, coal pitches often contain sulfur. Therefore, from the perspective of the sulfur content, it is preferable to use a petroleum pitch as a carbon source.

The carbonaceous material for a nonaqueous electrolyte secondary battery negative electrode according to the present invention can be produced with the production method for a carbonaceous material for a nonaqueous electrolyte secondary battery negative electrode according to the present invention. However, the carbonaceous material for a nonaqueous electrolyte secondary battery negative electrode according to the present invention can not only be produced by the production method of the present invention alone, but can also be produced by production methods other than the production method described above.

Pulverization Step

The pulverization step is performed in order to uniformize the particle size of the non-graphitizable carbon precursor. In the production method of the present invention, the non-graphitizable carbon precursor contains from 13 to 80 wt. % of a volatile component. Therefore, since the volatile component content generally often falls below 13 wt. % when preliminary calcination is performed, the pulverization step is performed prior to preliminary calcination. On the other hand, in the infusibilization step of oxidizing the petroleum pitch or coal pitch at 150 to 400° C., it is rare for the volatile component content to fall below 13 wt. %, so the pulverization step may be performed prior to the infusibilization step or after the infusibilization step. However, the heat treatment step (2) can be performed simultaneously with the infusibilization step, and in this case, the pulverization step is performed prior to the infusibilization step.

The pulverizer used for pulverization is not particularly limited, and a jet mill, a rod mill, a ball mill, or a hammer mill, for example, can be used.

Calcination Step

The calcination step in the production method of the present invention may be a calcination step consisting of only main calcination in which the pulverized non-graphitizable carbon precursor is calcined at an attainment temperature of from 800 to 1,600° C. or may be a calcination step in which the pulverized non-graphitizable carbon precursor is subjected to preliminary calcination at an attainment temperature of at least 350° C. and less than 800° C. and further subjected to main calcination at an attainment temperature of from 800 to 1,600° C. In addition, preliminary calcination and/or main calcination may be performed separately from the heat treatment step, or preliminary calcination and/or main calcination may be performed simultaneously with the heat treatment step. Examples of the procedures for preliminary calcination and main calcination will be described sequentially hereinafter.

Preliminary Calcination (Pre-Calcination)

The preliminary calcination step in the production method of the present invention can be performed, for example, by calcining a carbon source at a temperature of at least 350° C. and less than 800° C. Preliminary calcination removes volatile matter such as $CO_2$, CO, $CH_4$, and $H_2$, for example, and the tar content so that the generation of these components can be reduced and the burden of the calcination vessel can be reduced in main calcination.

The lower limit of the preliminary calcination temperature of the carbon source is not particularly limited but is preferably at least 350° C. and more preferably at least 400° C. Preliminary calcination can be performed in accordance with an ordinary preliminary calcination procedure. Specifically, preliminary calcination is performed in an inert gas atmosphere, and an example of an inert gas is nitrogen, argon, or the like. In addition, preliminary calcination can be performed under reduced pressure at a pressure of 10 kPa or less, for example. The preliminary calcination time is not particularly limited, but preliminary calcination may be performed for 0.5 to 10 hours, for example, and is preferably performed for 1 to 5 hours.

Main Calcination

The main calcination step in the production method of the present invention can be performed in accordance with an ordinary main calcination procedure, and a carbonaceous material for a nonaqueous electrolyte secondary battery negative electrode can be obtained by performing main calcination.

The specific temperature for the main calcination of a pulverized carbon precursor is from 800 to 1,600° C., preferably from 1,000 to 1,500° C., and more preferably from 1,100 to 1,400° C. Main calcination is performed in an inert gas atmosphere, and an example of an inert gas is nitrogen, argon, or the like. Furthermore, main calcination can also be performed in an inert gas containing a halogen gas. In addition, main calcination can be performed under reduced pressure at a pressure of 10 kPa or less, for example. The main calcination time is not particularly limited, but main calcination can be performed for 0.05 to 10 hours, for example, and is preferably performed for 0.05 to 3 hours, and more preferably for 0.05 to 1 hours.

Production of a Non-Graphitizable Carbon Precursor from a Tar or Pitch

In the production method of the present invention, a tar or pitch can be used as a non-graphitizable carbon precursor, and an example of the production of the non-graphitizable carbon precursor in this case will be described hereinafter.

A material obtained as described below, for example, can be used as a pitch-based carbon material. Specifically, after a 2- or 3-ring aromatic compound with a boiling point of at least 200° C. or a mixture thereof is added to a petroleum-based or coal-based tar or pitch as an additive and heated to be melted and mixed, the mixture is molded to obtain a pitch compact. Next, the additive is extracted and removed from the pitch compact with a solvent having low solubility with respect to the pitch and having high solubility with respect to the additive so as to form a porous pitch.

The pitch and the additive can be mixed while heating in a melted state in order to achieve a uniform mixture. The mixture of the pitch and the additive is preferably molded into particles with a particle size of at most 1 mm so that the additive can be easily extracted from the mixture. Molding may be performed in the melted state, and a method such as cooling and then pulverizing the mixture may be adopted. Suitable examples of solvents for extracting and removing the additive from the mixture of the pitch and the additive include aliphatic hydrocarbons such as butane, pentane, hexane, or heptane, mixtures of aliphatic hydrocarbon primary constituents such as naphtha or kerosene, and aliphatic alcohols such as methanol, ethanol, propanol, or butanol. By extracting the additive from the mixture compact of the pitch and the additive with such a solvent, it is possible to remove the additive from the compact while maintaining the shape of the compact. Here, it is presumed that a pitch compact having uniform porosity is obtained as a result of holes for the additive being formed in the compact.

The non-graphitizable carbon precursor used in the production method of the present invention is not limited, but a precursor having a low sulfur content is preferable. The sulfur content of the non-graphitizable carbon precursor is preferably at most 4,000 ppm, more preferably at most 3,000 ppm, even more preferably at most 2,000 ppm, even more preferably at most 1,000 ppm, and even more preferably at most 500 ppm. When the sulfur content is low, a nonaqueous electrolyte secondary battery produced using the obtained carbonaceous material exhibits excellent efficiency. That is, a nonaqueous electrolyte secondary battery using a carbonaceous material with a high sulfur content may have poor initial efficiency.

In addition, the non-graphitizable carbonaceous material obtained by the production method of the present invention is not limited, but the ratio (BET/CALC) of the specific surface area (BET) determined by a BET method and the specific surface area (CALC) obtained by the formula $6/(D_{V50} \times \rho_{Bt})$ using the average particle size $D_{V50}$ and the butanol true density $\rho_{Bt}$ is at least 4.5, more preferably at least 5.0, even more preferably at least 5.5, even more preferably greater than 5.5, even more preferably at least 5.6, and most preferably at least 6.0. A nonaqueous electrolyte secondary battery produced using a carbonaceous material having a high specific surface area ratio exhibits excellent output characteristics. In addition, the upper limit of the specific surface area ratio is not limited but is preferably at most 15.0, more preferably at most 13.0, and even more preferably at most 11.0. This is because when the specific surface area ratio is too high, the output characteristics are diminished.

Infusibilization (Oxidation)

The infusibilization step of the petroleum-based pitch or carbon-based pitch is not particularly limited as long as a porous pitch of the petroleum-based pitch or carbon-based pitch is crosslinked, and the step can be performed using an oxidizing agent, for example. The oxidizing agent is also not particularly limited, but a gas formed by diluting $O_2$, $O_3$, or $NO_2$ with air, nitrogen, or the like, a mixed gas thereof, or an oxidizing gas such as air can be used as a gas. In addition, an oxidizing liquid such as sulfuric acid, nitric acid, or hydrogen peroxide or a mixture thereof can be used as a liquid.

The oxidation temperature is also not particularly limited but is preferably from 150 to 400° C., more preferably from 180 to 350° C., and most preferably from 200 to 300° C. Furthermore, in the case of mild oxidation at a low temperature and/or for a short period of time, sufficient infusibilization does not occur, so a graphitizable carbon precursor may be formed.

Production of a Nonaqueous Electrolyte Secondary Battery

The carbonaceous material obtained by the production method of the present invention is used directly or, for example, together with 0.5 to 15 wt. % of a conductive assistant such as acetylene black or conductive carbon black. Furthermore, a binder is added, and after an appropriate amount of a solvent is added and kneaded to form an electrode mixture paste, a layer with a thickness of from 10 to 500 μm and preferably from 10 to 200 μm is formed by applying the paste to a conductive current collector made of a circular or rectangular metal sheet or the like, drying and pressure-molding the product. With this method, the resulting product is used for electrode production. The binder is not particularly limited as long as the binder does not react with electrolyte solutions such as polyvinylidene fluoride, polytetrafluoroethylene, and SBR and the like. In the case of polyvinylidene fluoride, a polar solvent such as N-methyl pyrrolidone (NMP) is preferably used, and an aqueous emulsion such as SBR may also be used. A preferable added amount of the binder is from 0.5 to 15 parts by weight per 100 parts by weight of the negative electrode material of the present invention. When the added amount of the binder is too large, since the resistance of the resulting electrode becomes large, the internal resistance of the battery becomes large. This diminishes the battery characteristics, which is not preferable. When the added amount of the binder is too small, the bonds between the negative electrode material particles and the bonds between the negative electrode material particles and the current collector become insufficient, which is not preferable.

When a negative electrode for a nonaqueous electrolyte secondary battery is formed using the negative electrode material of the present invention, the other materials constituting the battery such as the positive electrode material, separators, and the electrolyte solution are not particularly limited, and various materials that have been conventionally used or proposed for nonaqueous solvent secondary batteries can be used.

For example, laminated oxide-based (as represented by $LiMO_2$, where M is a metal such as $LiCoO_2$, $LiNiO_2$, $LiMnO_2$, or $LiNi_xCo_yMo_zO_2$ (where x, y, and z represent composition ratios), for example), olivine-based (as represented by $LiMPO_4$, where M is a metal such as $LiFePO_4$, for example), and spinel-based (as represented by $LiM_2O_4$, where M is a metal such as $LiMn_2O_4$, for example) complex metal chalcogen compounds are preferable as cathode materials, and these chalcogen compounds may be mixed as necessary. A positive electrode is formed by molding these positive electrode materials with an appropriate binder together with a carbon material for imparting conductivity to the electrode and forming a layer on a conductive current collector.

A nonaqueous electrolyte solution used with this positive electrode and negative electrode combination is typically formed by dissolving an electrolyte in a nonaqueous solvent. One type or two or more types of organic solvents such as propylene carbonate, ethylene carbonate, dimethyl carbonate, diethyl carbonate, dimethoxyethane, diethoxyethane, γ-butyl lactone, tetrahydrofuran, 2-methyl tetrahydrofuran, sulfolane, or 1,3-dioxolane, for example, may be used in combination as a nonaqueous solvent. In addition, $LiClO_4$, $LiPF_6$, $LiBF_4$, $LiCF_3SO_3$, $LiAsF_6$, $LiCl$, $LiBr$, $LiB(C_6H_5)_4$, $LiN(SO_3CF_3)_2$, or the like is used as an electrolyte. A secondary battery is typically formed by making a positive electrode layer and a negative electrode layer formed as described above face one another via a liquid-permeable separator made of a nonwoven fabric or another porous material as necessary and immersing the product in an electrolyte solution. As a separator, a liquid permeable separator formed from nonwoven fabric and other porous materials that is typically used in secondary batteries can be used. Alternatively, in place of a separator or together with a separator, a solid electrolyte formed from polymer gel in which an electrolyte solutions is impregnated can be also used.

EXAMPLES

The present invention will be described in detail hereinafter using working examples, but these working examples do not limit the scope of the present invention.

The measurement methods for the physical properties of the carbonaceous material for a nonaqueous electrolyte secondary battery negative electrode according to the present invention will be described hereinafter, but the physical properties described in this specification, including those in the working examples, are based on values determined by the following methods.

Evaluation Test Items (XRD Measurement)

"$d_{002}$ of the carbon material": A sample holder is filled with a carbonaceous material powder, and an X-ray diffraction pattern is obtained using CuKα rays monochromatized by a Ni filter as a radiation source. The peak position of the diffraction pattern is determined by the method of elastic center (method of determining the center of gravity position of diffraction lines and determining the peak position with a corresponding value of 2θ, and this is corrected using a diffraction peak of the (111) face of a high-purity silicone powder used as a reference substance. The wavelength of the CuKα rays is set to 0.15428 nm, and $d_{002}$ is calculated by Bragg's equation.

$$d_{002}=\gamma/(2\sin\theta)$$

(Specific Surface Area)

"Specific surface area based on nitrogen adsorption": A value Vm was determined by a one-point method (relative pressure x=0.3) based on nitrogen adsorption at the temperature of liquid nitrogen using the approximation Vm=1/(v(1−x)) derived from the B.E.T. equation, and the specific surface area of the sample was calculated from the following formula.

Specific surface area=4.35×$Vm$ (m$^2$/g)

Here, Vm is the amount of adsorption (cm$^3$/g) required to form a monomolecular layer on the sample surface; v is the amount of adsorption (cm$^3$/g) that is actually measured; and x is the relative pressure. Specifically, the amount of adsorption of nitrogen in the carbonaceous substance at the temperature of liquid nitrogen was measured as follows using a "Flow Sorb II2300" made by MICROMERITICS.

A test tube is filled with the carbonaceous material, and the test tube is cooled to −196° C. while infusing helium gas containing nitrogen gas at a concentration of 30 mol % so that the nitrogen is adsorbed in the carbonaceous material. Next, the amount of nitrogen eliminated from the sample by returning the test tube to room temperature was measured with a thermal conductivity detector and used as the amount of adsorbed gas v.

(Measurement of Particle Size Distribution)

A dispersant (surfactant "SN-WET 366" (made by the San Nopco Co.)) was added and blended into the sample. Next, after purified water was added and dispersed using ultrasonic waves, the particle size distribution in a particle size range of from 0.5 to 3,000 μm was determined with a particle size distribution measurement device ("SALD-30005" made by the Shimadzu Corporation) by setting the refractive index to 2.0 to 0.1 i.

Average particle size D$_{V50}$ (μm): The average particle size D$_{V50}$ was determined from the particle size distribution as the particle size yielding a cumulative volume of 50%.

(Butanol True Density)

Measurements were performed using butanol in accordance with the method prescribed in JIS R7212. The mass (m$_1$) of a pycnometer with a bypass line having an internal volume of approximately 40 mL was precisely measured. Next, after a sample was placed flat at the bottom of the pycnometer so as to have a thickness of approximately 10 mm, the mass (m$_2$) was precisely measured. Next, 1-butanol was slowly added to the bottle to a depth of approximately 20 mm from the base. Next, the pycnometer was gently oscillated, and after it was confirmed that no large air bubbles were formed, the bottle was placed in a vacuum desiccator and gradually evacuated to a pressure of 2.0 to 2.7 kPa. The pressure was maintained for 20 minutes or longer, and after the generation of air bubbles stopped, the bottle was removed and further filled with 1-butanol. After a stopper was inserted, the bottle was immersed in a constant-temperature bath (adjusted to 30±0.03° C.) for at least 15 minutes, and the liquid surface of 1-butanol was aligned with the marked line. Next, the bottle was removed, and after the outside of the bottle was thoroughly wiped and the bottle was cooled to room temperature, the mass (m$_4$) was precisely measured. Next, the same specific gravity bottle was filled with 1-butanol and immersed in a constant-temperature water bath in the same manner as described above. After the marked line was aligned, the mass (m$_3$) was measured. In addition, distilled water which was boiled immediately before use and from which the dissolved gas was removed was placed in the specific gravity bottle and immersed in a constant-temperature water bath in the same manner as described above. After the marked line was aligned, the mass (m$_5$) was measured. The true density ($\rho_{Bt}$) is calculated using the following formula.

$$\rho_{Bt} = \frac{m_2 - m_1}{m_2 - m_1 - (m_4 - m_3)} \times \frac{m_3 - m_1}{m_5 - m_1} d \quad \text{[Formula 1]}$$

(Here, d is the specific gravity (0.9946) in water at 30° C.)

(Atom Ratio of Hydrogen Atoms/Carbon Atoms (H/C))

The atom ratio was measured in accordance with the method prescribed in JIS M8819. That is, each of the weight proportions of hydrogen and carbon in a sample obtained by elemental analysis using a CHN analyzer (240011 manufactured by Perkin Elmer Inc.) was divided by the mass number of each element, and then the ratio of the numbers of hydrogen/carbon atoms was determined.

(Volatile Component Measurement)

The amount of the volatile component was measured as follows. First, 20 mg of a measurement sample (pulverized carbon precursor) was precisely measured, placed in a platinum pan, and set in a device (DTG-50 manufactured by the Shimadzu Corporation). Nitrogen gas was infused at 200 mL/min, and the decrease in weight was measured after heating from room temperature to 1,000° C. at a heating rate of 10° C./min. As a reference, α-alumina produced by the Shimadzu Corporation was used.

(Sulfur Content Measurement)

The sulfur content was measured in accordance with the method prescribed in JIS K0103.

First, 10 mL of 30% hydrogen peroxide water was diluted with 990 mL of distilled water to form an absorbing solution. Next, 50 mL of the absorbing solution was placed in each of two absorption bottles with a volume of 250 mL, and the two bottles were connected. A suction pump was activated to circulate a combustion gas of the sample into the absorption bottles. At this time, the flow rate was adjusted to 1 L/min.

The content of the absorption bottles was transferred to a beaker, and after the absorption bottles were further washed with distilled water, the washing solution was also added to the beaker. The content was diluted so as to fall within the determination limit, and this was used as a sample solution for analysis. The sulfur concentration of the sample solution for analysis was measured using an ion chromatography method. A suppresser-type device with a conductivity detector was used as an ion chromatograph, and AS-4A SC made by the Dionex Corporation was used as a column. As an eluant, a mixed aqueous solution of sodium hydrogen carbonate (1.7 mM) and sodium carbonate (1.8 mM) was prepared. The ion chromatogram was set to a measurable state, and the eluant was infused into the separation column at a constant flow rate. A constant amount of the sample solution for analysis was introduced into the ion chromatogram, and the chromatogram was recorded. The sulfuric acid ion concentration (a) (mg/mL) was determined from a calibration curve created in advance. The same operations were repeated for the absorbing solution, and the blank test value (b) (mg/mL) for sulfuric acid ions was determined. The volume fraction (Cv) (vol ppm) of the sulfur oxide in the sample gas was determined from the following formula using the total flask volume v and the amount of sample gas collected Vs.

$Cv=0.233\times(a-b)\times v\times 1000/Vs$

Furthermore, the mass concentration (Cm) (mg/m$^3$) when the sulfur oxide in the sample gas is expressed as sulfur dioxide was determined from the following formula.

$Cw=Cv\times 2.86$

Working Example 1

First, 70 kg of a petroleum-based pitch with a softening point of 205° C. and an H/C atomic ratio of 0.65 and 30 kg of naphthalene were charged into a pressure-resistant container with an internal volume of 300 liters and having a stirring blade and an outlet nozzle, and after the substances were melted and mixed while heating at 190° C., the mixture was cooled to 80 to 90° C. The inside of the pressure-resistant container was pressurized by nitrogen gas, and the content was extruded from the outlet nozzle to obtain a string-shaped compact with a diameter of approximately 500 μm. Next, this string-shaped compact was pulverized so that the ratio (L/D) of the diameter (D) and the length (L) was approximately 1.5, and the resulting pulverized product was added to an aqueous solution in which 0.53 mass % of polyvinyl alcohol (degree of saponification: 88%) heated to 93° C. is dissolved, dispersed while stirring, and cooled to obtain a spherical pitch compact slurry. After most of the water was removed by filtration, the naphthalene in the pitch compact was extracted with n-hexane with a weight approximately six times that of the spherical pitch compact and removed. The porous spherical pitch obtained in this way was heated to 270° C. while circulating heated air using a fluidized bed and oxidized while being held for one hour at 270° C. so as to obtain a porous spherical oxidized pitch which is infusible with respect to heat (carbon precursor (infusibilized)). Next, 100 g of the oxidized pitch was pulverized with a jet mill (AIR JET MILL made by Hosokawa Micron Co., Ltd.; MODEL 100AFG) at a revolution speed of 7,000 rpm to form a pulverized carbon precursor with an average particle size of approximately 10 μm. Next, this was placed in a vertical tubular furnace with an inside diameter of 50 mm and a height of 900 mm, and this was heated to 650° C. while infusing nitrogen gas at normal pressure from the lower part of the device at a flow rate of 0.3 NL/min. This was held for one hour at 650° C. and subjected to preliminary carbonization (pre-calcination) to obtain a pre-calcined pulverized carbon precursor. Heat treatment in this working example was performed simultaneously with preliminary carbonization. Next, 10 g of the pre-calcined pulverized carbon precursor was placed in a horizontal tubular furnace with a diameter of 100 mm and heated to 1,200° C. at a heating rate of 250° C./h. This was held for one hour at 1,200° C. and subjected to main calcination to prepare a carbonaceous material 1. Main calcination was performed in a nitrogen atmosphere with a flow rate of 10 L/min.

Working Example 2

A carbonaceous material 2 was prepared in the same manner as in Working Example 1 with the exception that the revolution speed of the jet mill was set to 6,300 rpm. Heat treatment in this working example was performed simultaneously with preliminary carbonization.

Working Example 3

A carbonaceous material 3 was prepared in the same manner as in Working Example 1 with the exception that the revolution speed of the jet mill was set to 12,000 rpm. Heat treatment in this working example was performed simultaneously with preliminary carbonization.

Working Example 4

A carbonaceous material 4 was prepared in the same manner as in Working Example 1 with the exception that the porous spherical pitch was pulverized prior to being oxidized.

Pulverization and oxidation were performed specifically as follows. First, 100 g of the porous spherical pitch (carbon precursor (prior to infusibilization)) was pulverized with a jet mill at a revolution speed of 6,500 rpm to form a pulverized carbon precursor (prior to infusibilization) with an average particle size of approximately 10 μm. The pulverized carbon precursor (prior to infusibilization) was heated to 260° C. while circulating heated air with a muffle furnace (KDF-100 made by Denken Co., Ltd.) and was oxidized while being held for one hour at 260° C. so as to obtain a pulverized carbon precursor which is infusible with respect to heat. Most of the heat treatment in this working example was performed simultaneously with preliminary carbonization.

Working Example 5

A carbonaceous material 5 was prepared in the same manner as in Working Example 1 with the exception that the oxidation conditions of Working Example 1 were set to 245° C. Heat treatment in this working example was performed simultaneously with preliminary carbonization.

Comparative Example 1

A comparative carbonaceous material 1 was prepared in the same manner as in Working Example 1 with the exception that the material was pulverized after preliminary calcination. Preliminary calcination and pulverization were performed specifically as follows. A carbon precursor was placed in a vertical tubular furnace with an inside diameter of 50 mm, and this was heated to 650° C. while infusing nitrogen gas at normal pressure from the lower part of the device at a flow rate of 5 NL/min. This was held for one hour at 650° C. and subjected to preliminary carbonization (pre-calcination) to obtain a preliminarily calcined carbon precursor. Next, the preliminarily calcined carbon precursor was pulverized with a jet mill at a revolution speed of 6,500 rpm to form a preliminarily calcined pulverized carbon precursor with an average particle size of approximately 10 μm.

Comparative Example 2

A comparative carbonaceous material 2 as prepared in the same manner as in Working Example 2 with the exception that the material was pulverized after preliminary calcination.

Preliminary calcination and pulverization were performed specifically as follows. A carbon precursor was placed in a vertical tubular furnace with an inside diameter of 50 mm, and this was heated to 650° C. while infusing nitrogen gas at normal pressure from the lower part of the device at a flow rate of 5 NL/min. This was held for one hour at 650° C. and subjected to preliminary carbonization (pre-calcination) to obtain a preliminarily calcined carbon precursor. Next, the preliminarily calcined carbon precursor was pulverized with a jet mill at a revolution speed of 12,000 rpm to form a preliminarily calcined pulverized carbon precursor with an average particle size of approximately 5 μm.

Comparative Example 3

A comparative carbonaceous material 3 as prepared in the same manner as in Working Example 5 with the exception that the material was pulverized after preliminary calcination.

Comparative Example 4

In this example, a comparative carbonaceous material 4 was prepared using a coal pitch with a large sulfur content.

The comparative carbonaceous material 4 was prepared in the same manner as in Working Example 4 with the exception that a coal pitch with a softening point of 212° C. was used.

Measurement Cell Production Method

Nonaqueous electrolyte secondary batteries were produced as follows using the negative electrode materials produced in each of the working examples and comparative examples described above (carbonaceous materials 1 to 4 and comparative carbonaceous materials 1 and 2), and the characteristics thereof were evaluated. Although the negative electrode material of the present invention is suitable for forming a negative electrode for a nonaqueous electrolyte secondary battery, in order to precisely evaluate the discharge capacity and the irreversible capacity of the battery active material without being affected by fluctuation in the performance of the counter electrode, a lithium secondary battery was formed using the electrode obtained above together with a counter electrode comprising lithium metal with stable characteristics, and the characteristics thereof were evaluated.

A positive electrode (carbon electrode) was produced as follows. First, N-methyl-2-pyrrolidone was added to 90 parts by weight of the negative electrode material (carbonaceous material) produced in each example and 10 parts by weight of polyvinylidene fluoride, and this was formed into a pasty consistency and uniformly applied to copper foil. After the sample was dried, a sheet-like electrode was stamped into a disc shape with a diameter of 15 mm, and this was pressed to form an electrode. The weight of the carbonaceous material (negative electrode material) in the electrode was adjusted to 10 mg, and the material was pressed so that the filling rate of the carbonaceous material was approximately 67%.

The negative electrode (lithium electrode) was prepared inside a glove box in an Ar gas atmosphere. An electrode was formed by spot-welding a stainless steel mesh disc with a diameter of 16 mm on the outer lid of a 2016-size coin-type battery can in advance, punching a thin sheet of metal lithium with a thickness of 0.8 mm into a disc shape with a diameter of 15 mm, and pressing the thin sheet of metal lithium into the stainless steel mesh disc.

Using the positive electrode and the negative electrode produced in this way, $LiPF_6$ was added at a ratio of 1.5 mol/L to a mixed solvent prepared by mixing ethylene carbonate, dimethyl carbonate, and ethyl methyl carbonate at a volume ratio of 1:2:2 as an electrolyte solution. A polyethylene gasket was used as a fine porous membrane separator made of borosilicate glass fibers with a diameter of 19 mm to assemble a 2016-size coin-type nonaqueous electrolyte lithium secondary battery in a glove box with an Ar atmosphere.

Measurement of Battery Capacity

Charge-discharge tests were performed on a lithium secondary battery with the configuration described above using a charge-discharge tester (TOSCAT" made by Toyo System Co., Ltd.) in accordance with a constant current/constant voltage method. Here, "charging" refers to a discharging reaction in the test battery, but in this case, the reaction is one in which lithium is inserted into the carbon material, so it will be described as "charging" hereafter for the sake of convenience. Conversely, "discharging" refers to a charging reaction in the test battery but is described as "discharging" for the sake of convenience since it is an elimination reaction for removing lithium from the carbon material. In the constant current/constant voltage method employed here, charging is performed at a constant current density of 0.5 $mA/cm^2$ until the battery voltage reaches 0 V, and charging is then continued until the current value reaches 20 μA while constantly changing the current value so as to maintain the voltage at 0 V (while maintaining a constant voltage). At this time, a value determined by dividing the electricity supply by the weight of the carbon material of the electrode is defined as the charge capacity per unit weight of the carbon material (mAh/g). After the completion of charging, the battery circuit was opened for 30 minutes, and discharging was performed thereafter. Discharging is performed at a constant current density of 0.5 $mA/cm^2$ until the battery voltage reaches 1.5 V, and a value determined by dividing the amount of electricity discharged at this time by the weight of the carbon material of the electrode is defined as the discharge capacity per unit weight of the carbon material (mAh/g). The irreversible capacity is calculated as the charge capacity minus the discharge capacity.

The charge-discharge capacity and irreversible capacity were determined by averaging n=3 measurements for test batteries produced using the same sample.

Rapid Discharge Test

A rapid discharge test was performed with the following method using the battery described above. After charging and discharging were performed in accordance with (Measurement of battery capacity), doping was performed with a constant low-voltage, constant-current method with a charge current density of 2.5 $mA/cm^2$, and de-doping was performed by varying the discharge current density to 5 $mA/cm^2$, 10 $mA/cm^2$, 15 $mA/cm^2$, 20 $mA/cm^2$, and 25 $mA/cm^2$. A value determined by dividing the discharge capacity at the time of discharge at each current density by the discharge capacity when the discharge current density was 0.5 $mA/cm^2$ was used as the discharge capacity retention at each discharge current.

Figure 1:
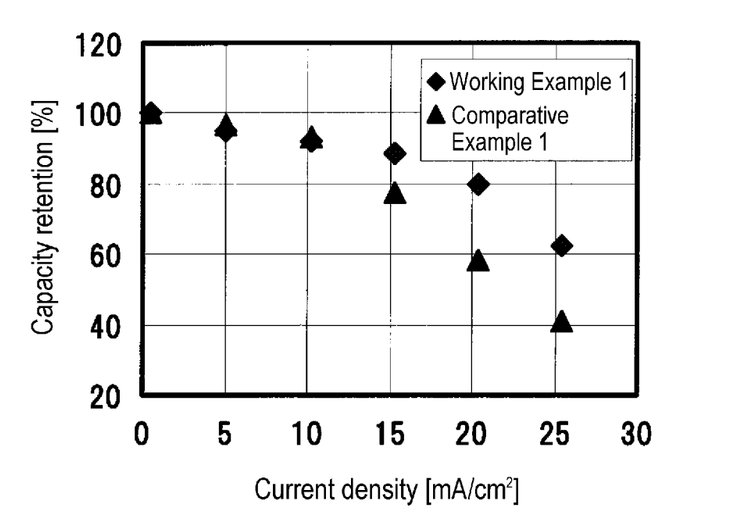
FIG. 1 illustrates the capacity retention at a current density of from 5 mA/cm$^2$ to 25 mA/cm$^2$ of lithium ion secondary batteries produced using a carbonaceous material 1 and a comparative carbonaceous material 1 of Working Example 1 and Comparative Example 1.

The capacity retention of batteries produced using the carbonaceous materials of each of the working examples and comparative examples at 25 $mA/cm^2$ is shown in Table 1, and the capacity retention of batteries produced using the carbonaceous material 1 and the comparative carbonaceous material 1 of Working Example 1 and Comparative Example 1 at a current density of from 5 $mA/cm^2$ to 25 $mA/cm^2$ is illustrated in FIG. 1.

TABLE 1

| | Raw material | Volatile component amount [Wt. %] | H/C [—] | Average particle size $D_{V50}$ [μm] | Specific surface area (BET) [$m^2$/g] | $d_{002}$ [nm] | True density$_{Bt}$ [g/$cm^3$] |
|---|---|---|---|---|---|---|---|
| Working Example 1 | Petroleum pitch | 25.8 | 0.02 | 12.6 | 3.1 | 0.382 | 1.52 |
| Working Example 2 | Petroleum pitch | 26.0 | 0.02 | 8.1 | 3.6 | 0.381 | 1.52 |

TABLE 1-continued

| | Raw material | | | | | | |
|---|---|---|---|---|---|---|---|
| Working Example 3 | Petroleum pitch | 26.3 | 0.02 | 4.1 | 5.6 | 0.381 | 1.52 |
| Working Example 4 | Petroleum pitch | 31.0 | 0.02 | 12.2 | 2.9 | 0.382 | 1.52 |
| Working Example 5 | Petroleum pitch | 25.6 | 0.02 | 9.8 | 3.3 | 0.381 | 1.54 |
| Comparative Example 1 | Petroleum pitch | 4.3 | 0.02 | 10.0 | 7.5 | 0.382 | 1.52 |
| Comparative Example 2 | Petroleum pitch | 4.5 | 0.02 | 4.4 | 10.1 | 0.381 | 1.52 |
| Comparative Example 3 | Petroleum pitch | 4.4 | 0.02 | 10.3 | 7.1 | 0.381 | 1.54 |
| Comparative Example 4 | Coal pitch | 4.9 | 0.02 | 11.9 | 1.2 | 0.376 | 1.64 |

| | Raw material | Specific surface area (CALC) $6/D_{V50} \times Bt$ [$m^2/g$] | Specific surface area ratio (BET/CALC) | Sulfur content [ppm] |
|---|---|---|---|---|
| Working Example 1 | Petroleum pitch | 0.31 | 9.8 | 95 |
| Working Example 2 | Petroleum pitch | 0.49 | 7.3 | 100 |
| Working Example 3 | Petroleum pitch | 0.96 | 5.8 | 110 |
| Working Example 4 | Petroleum pitch | 0.32 | 9.0 | 134 |
| Working Example 5 | Petroleum pitch | 0.40 | 8.3 | 121 |
| Comparative Example 1 | Petroleum pitch | 0.40 | 18.9 | 96 |
| Comparative Example 2 | Petroleum pitch | 0.90 | 11.3 | 103 |
| Comparative Example 3 | Petroleum pitch | 0.38 | 18.8 | 115 |
| Comparative Example 4 | Coal pitch | 0.31 | 3.9 | 5110 |

TABLE 2

| | Charge capacity [mAh/g] | Discharge capacity [mAh/g] | Irreversible capacity [mAh/g] | Efficiency [%] | Output characteristics [%] |
|---|---|---|---|---|---|
| Working Example 1 | 532 | 470 | 62 | 88.3 | 61.3 |
| Working Example 2 | 549 | 480 | 69 | 87.5 | 62.2 |
| Working Example 3 | 550 | 471 | 78 | 85.8 | 62.1 |
| Working Example 4 | 544 | 476 | 68 | 87.6 | 59.8 |
| Working Example 5 | 506 | 454 | 52 | 89.7 | 59.9 |
| Comparative Example 1 | 525 | 458 | 67 | 87.3 | 41.2 |
| Comparative Example 2 | 552 | 472 | 79 | 85.6 | 40.6 |
| Comparative Example 3 | 506 | 450 | 56 | 89.0 | 40.8 |
| Comparative Example 4 | 431 | 359 | 71 | 83.4 | 51.3 |

INDUSTRIAL APPLICABILITY

Since a nonaqueous electrolyte secondary battery using the carbonaceous material for a negative electrode according to the present invention has a large charge-discharge capacity and excellent rate characteristics, the battery can be used for hybrid electric vehicles (HEV) and electric vehicles (EV), which require long life and high input/output characteristics. In particular, the battery is useful as a nonaqueous electrolyte secondary battery for an electric vehicle (EV) driven by a motor alone.

The present invention was described above using specific modes of embodiment, but modifications and improvements apparent to persons having ordinary skill in the art are also included in the scope of the present invention.

The invention claimed is:

1. A carbonaceous material for a nonaqueous electrolyte secondary battery negative electrode obtained by heat-treating a non-graphitizable carbon precursor which is pulverized and contains more than 25.6 wt. % and not more than 80 wt.% of a volatile component after the pulverization,
    wherein the carbonaceous material for a nonaqueous electrolyte secondary battery negative electrode has a sulfur content of at most 4,000 ppm and a specific surface area ratio of greater than 5.5 and at most 11.0 calculated by the following formula:
        the specific surface area ratio =BET/CALC;
    wherein BET (Brunauer-Emmett-Teller) is a specific surface area having units of $m^2/g$ determined by a BET method, and CALC is a value obtained by a formula: $6/(D_{v50} \times \rho_{Bt})$, wherein $D_{v50}$ is average particle size having units of pm and pm is butanol true density having units of $g/cm^3$; and
    wherein the heat-treating comprises a heat treatment in which the non-graphitizable carbon precursor is held for at least one minute at a temperature of from 250 to 800° C.

2. The carbonaceous material for a nonaqueous electrolyte secondary battery negative electrode according to claim 1, wherein the heat-treating comprises:
    a main calcination with an attainment temperature of from 800 to 1,600° C.

3. The carbonaceous material for a nonaqueous electrolyte secondary battery negative electrode according to claim 1, wherein an average interlayer spacing $d_{002}$ of a (002) face determined by X-ray diffraction is from 0.375 to 0.400 nm, and a true density is from 1.40 to 1.60 g/cm$^3$.

4. A method of producing a carbonaceous material for a nonaqueous electrolyte secondary battery negative electrode, the method comprising:

(1) a step of pulverizing a non-graphitizable carbon precursor to obtain a non-graphitizable carbon precursor containing more than 25.6 wt. % and not more than 80 wt.% of a volatile component;

(2) a heat treatment step of holding the pulverized non-graphitizable carbon precursor for at least one minute at a temperature of from 250 to 800° C.; and (3) a calcination step of calcining the product at an attainment temperature of from 800 to 1,600° C., wherein the carbonaceous material for a nonaqueous electrolyte secondary battery negative electrode has a sulfur content of at most 4,000 ppm and a specific surface area ratio of greater than 5.5 and at most 11.0 calculated by the following formula:

the specific surface area ratio =BET/CALC;

wherein BET (Brunauer-Emmett-Teller) is a specific surface area having units of m$^2$/g determined by a BET method, and CALC is a value obtained by a formula: $6/(D_{v50} \times \rho_{Bt})$, wherein $D_{v50}$ is average particle size having units of μm and $\rho_{Bt}$ is butanol true density having units of g/cm$^3$.

5. A negative electrode for a nonaqueous electrolyte secondary battery comprising the carbonaceous material for a negative electrode described in claim 1.

6. A nonaqueous electrolyte secondary battery comprising the negative electrode according to claim 5.

* * * * *